United States Patent [19]
Schweitzer, III

[11] Patent Number: 4,996,624
[45] Date of Patent: Feb. 26, 1991

[54] FAULT LOCATION METHOD FOR RADIAL TRANSMISSION AND DISTRIBUTION SYSTEMS

[75] Inventor: Edmund O. Schweitzer, III, Whitman County, Wash.

[73] Assignee: Schweitzer Engineering Laboratories, Inc., Pullman, Wash.

[21] Appl. No.: 413,839

[22] Filed: Sep. 28, 1989

[51] Int. Cl.$^5$ .............................................. H02H 3/26
[52] U.S. Cl. ....................................... 361/63; 361/65; 361/79; 361/76
[58] Field of Search ...................... 361/62, 63, 65, 76, 361/79; 324/512, 521, 522, 525; 264/481, 482, 483

[56] References Cited

U.S. PATENT DOCUMENTS

4,686,601  8/1987  Alexander et al. ............... 361/76 X

*Primary Examiner*—Derek S. Jennings
*Attorney, Agent, or Firm*—Flehr, Hohbach, Test, Albritton & Herbert

[57] ABSTRACT

A method of locating a phase-to-ground fault in a radial distribution system with a tapped load. The method includes determining the positive-sequence impedance from the residual current, the residual current compensation factor and the phase-to-ground voltage of the faulted line. The positive-sequence impedance is then used to determine the distance to the fault.

4 Claims, 2 Drawing Sheets

FAULT LOCATION METHOD FOR RADIAL TRANSMISSION AND DISTRIBUTION SYSTEMS

FIELD OF THE INVENTION

The present invention relates generally to systems for locating faults, and more particularly to a method for locating faults on radial transmission and distribution lines with tapped loads.

BACKGROUND OF THE INVENTION

Electronic methods for locating transmission line faults include: relating oscillographic readings to short-circuit study data; processing digital oscillograph readings in a fault locating program; and using two-end travelling-way fault locators, one-end travelling-way fault locators, one-end impedance-measuring fault locators, or two-end impedance-based fault locators. The one-end impedance-measuring fault locators calculate the fault location from the apparent impedance seen looking into the line from one end. They have been proven to be the most practical, since no communications channel (other than possibly one for remote reading of the fault location) is required, and they are generally easy to install and operate. Two-end impedance-based fault locators use the voltage and current information at both ends of the line to calculate the fault location. The advantage of this scheme is that ground faults can be located without knowing the zero-sequence impedance of the transmission line. The disadvantage is that data must be retrieved and then processed by a relatively skilled individual.

Locating faults requires many of the same signal processing steps as protecting transmission lines. To accurately locate all fault types in a three phase (A, B, C) system, the phase-to-ground voltages (VA, VB, VC) and the currents (IA, IB, IC) in each phase must be measured. However, when line-to-line voltages (VAB, VBC, VCA) only are available, it is possible to locate phase-to-phase faults accurately. Ground faults can also be located reasonably well in most cases, if the zero-sequence source impedance (ZS0) is known.

The phasor quantities must be extracted. This requires filtering to ensure that transients do not affect the measurement of phasor quantities. Analog and digital filters may be used. The analog filter removes all high frequency components, and the digital filter removes DC offset.

Knowledge of the fault type is essential for accurate single-end fault locating, as the fault type determines the measuring loop to be used. Different techniques may be used to determine fault type. One technique is to determine the fault type from the relay elements which operate. The other technique is to use a separate fault-type determination process exclusively for the fault locator. This latter technique tests and compares the phase and residual currents (IR). Another technique which has been used is to use the information from external starting elements such as the distance or overcurrent elements in a line protection terminal. Still another way, which has been used by programs which analyze digital oscillographic records, is manual specification of the fault type, relying on a skilled operator for fault-type determination.

As is known, various impedance calculations may be employed, depending on the fault type (ground faults, three phase faults, phase-to-phase faults, and phase-to-phase to ground faults) to calculate the apparent positive-sequence impedance (Z1) of the fault. One of the following impedance calculations may be employed, depending on the fault type, to calculate the impedance Z1 to the fault:

Ground (G) Faults:

| AG: | $Z1 = VA/(IA + k \times IR)$ |
| BG: | $Z1 = VB/(IB + k \times IR)$ |
| CG: | $Z1 = VC/(IC + k \times IR)$ | where k (the residual current compensation factor) = $(ZL0 - ZL1)/3ZL1$, IR = the residual current, ZL0 = the zero-sequence impedance of the line, and ZL1 = the positive-sequence impedance of the line.

Phase-to-Phase and Phase-to-Phase to Ground Faults:

| AB or ABG: | $Z1 = VAB/IAB$ |
| BC or BCG: | $Z1 = VBC/IBC$ |
| CA or CAG: | $Z1 = VCA/ICA$ |

Three-Phase Faults:
Any of the above equations.

The measured impedance unfortunately depends on many factors not represented in these equations. These include no or imperfect transposition between the fault and the measurement bus, mutual coupling to nearby circuits, load flow, and fault resistance. Other problems arise from taps, conductor configuration changes, instrument transformer errors, nonuniform or unknown soil resistivity, etc.

Once the apparent positive-sequence impedance Z1 to the fault is calculated, the distance to fault is determined by dividing the measured reactance by the total reactance for the line and multiplying by the line length. This approach, which is a straight reactance calculation, eliminates the effects of fault resistance under conditions of light loading. On more heavily-loaded lines, faults with considerable resistance are not accurately located by this method, since the voltage drop at the fault in the fault resistance has both a resistive and a reactive component, as seen from either end. The reactive component of this drop is an error term not eliminated by this simple calculation. A calculation which takes prefault load flow into account to reduce the effects of fault resistance and load flow on fault location calculations is disclosed in Takagi, et al., "Development of a New Type of Fault Locator Using the One-Terminal Voltage and Current Data", *IEEE Transactions on Power Apparatus and Systems*, Vol PAS-101, No. 8, August, 1982.

Generally, on radial transmission and distribution lines, or any line where the infeed from the remote end is small compared to the total fault current, or when the load flow is small on an interconnection, the fault-locating errors due to fault resistance and load flow are negligible, even with the straight reactance calculation. This is useful to know, since a hand calculation of fault location used in the straight reactance calculation is easier than a hand calculation used in the above-discussed Takagi, et al. algorithm. Indeed, when pre-fault information is unavailable, the Takagi, et al. algorithm cannot be used.

Tapped loads seldom make any significant difference in fault location, since delta-wye transformer connections are usually used (no ground source), and since the impedances of the transformers are generally large compared to the line impedance. However, the tapped load currents do make a difference when the load current is near the short circuit current.

The method of the present invention provides a means for locating phase-to-ground faults in radial transmission and distribution lines with tapped loads. This method, however, will not locate three phase faults, phase-to-phase faults and phase-to-phase to ground faults. However, about 90% of all faults are phase-to-ground faults.

Thus, an object of the present invention is to provide a method for locating phase-to-ground faults on radial circuits with tapped loads where the load currents are significant.

BRIEF SUMMARY OF THE INVENTION

A method for determining the positive-sequence impedance to a fault in a radial distribution circuit including measuring the phase-to-ground voltage of the faulted line and the zero-sequence component of the fault current. The residual current (IR) is determined, and that current and the residual current compensation factor are used to determine the positive-sequence impedance by dividing the phase-to-ground voltage by $IR \times (1+k)$. The distance to the fault is then determined by dividing the positive-sequence reactance by the total reactance of the faulted line and multiply that value by the total line length.

DESCRIPTION OF THE DRAWINGS

Additional features of the invention will be evident from the following description taken in conjunction with the accompanying drawings wherein.

DESCRIPTION OF THE PREFERRED EMBODIMENT

Figure 1:
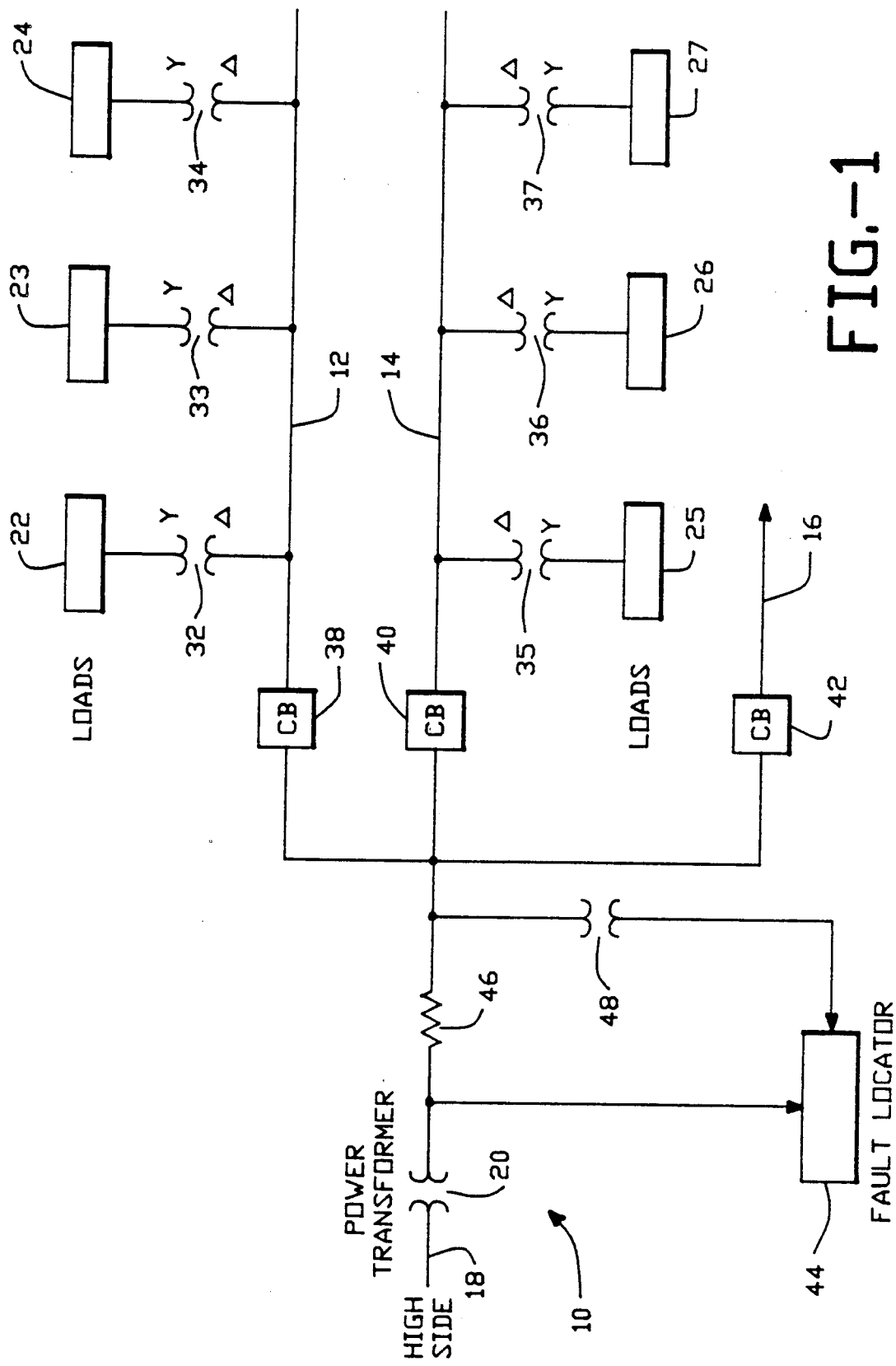
FIG. 1 is a schematic view of a radial transmission and distribution circuit with tapped loads.

Referring now to the drawings, wherein like reference numerals for like components are utilized throughout the drawings, attention is first directed to FIG. 1. FIG. 1 shows a radial transmission and distribution system indicated generally by reference numeral 10. The system 10 includes a number of radial feeders 12, 4, and 16. Only three radial feeders are shown; however, as known, some other number of radial feeders may be used. Power to the radial feeders is available from a high voltage bus 18. The power is stepped down by means of a power transformer 20. For example, the voltage on the bus 18 may be 115 kilovolts (kV) with the voltage on the busses or radial feeders 12, 14, and 16 at 34.5 (kV).

As is shown, each radial feeder has a number of tapped loads 22-27 connected to its respective feeder though delta (Δ) - wye (y) transformers 32-37. The transformers 32-37 step down the power from the feeders 12, 14, and 16 to the loads tapped into those feeders. A protective circuit breaker (CB) is included in each radial feeder. As such, busses 12, 14, and 16 include respective circuit breakers 38, 40, and 42.

A fault locator 44 is connected in system 10 on the low side of power transformer 20. Fault locator 44 is connected at this point by means of a current transformer 46 and a power transformer 48. The current transformer provides relay currents and the power transformer provides relay voltages to fault locator 44. An example of a fault locator that may be used to carry out the method of the present invention is a SEL-121 Relay available from Schweitzer Engineering Laboratories, Inc., Pullman, Wash., the assignee of the present invention.

If a fault should occur in one of the radial feeders, the currents in the unfaulted circuits are load currents. Generally, these load currents have little effect on the fault locating accuracy of the fault locator. The use of one fault locating relay or fault locator among several radial circuits or feeders provides economic fault locating at voltages where fault locating could never be considered before. By the process of the present invention, a fault can be located in a radial system by a single fault locator even if the load currents are significant. This method makes use of the total current into the group of radial feeders. The method will be now described with respect to FIG. 2.

Figure 2:
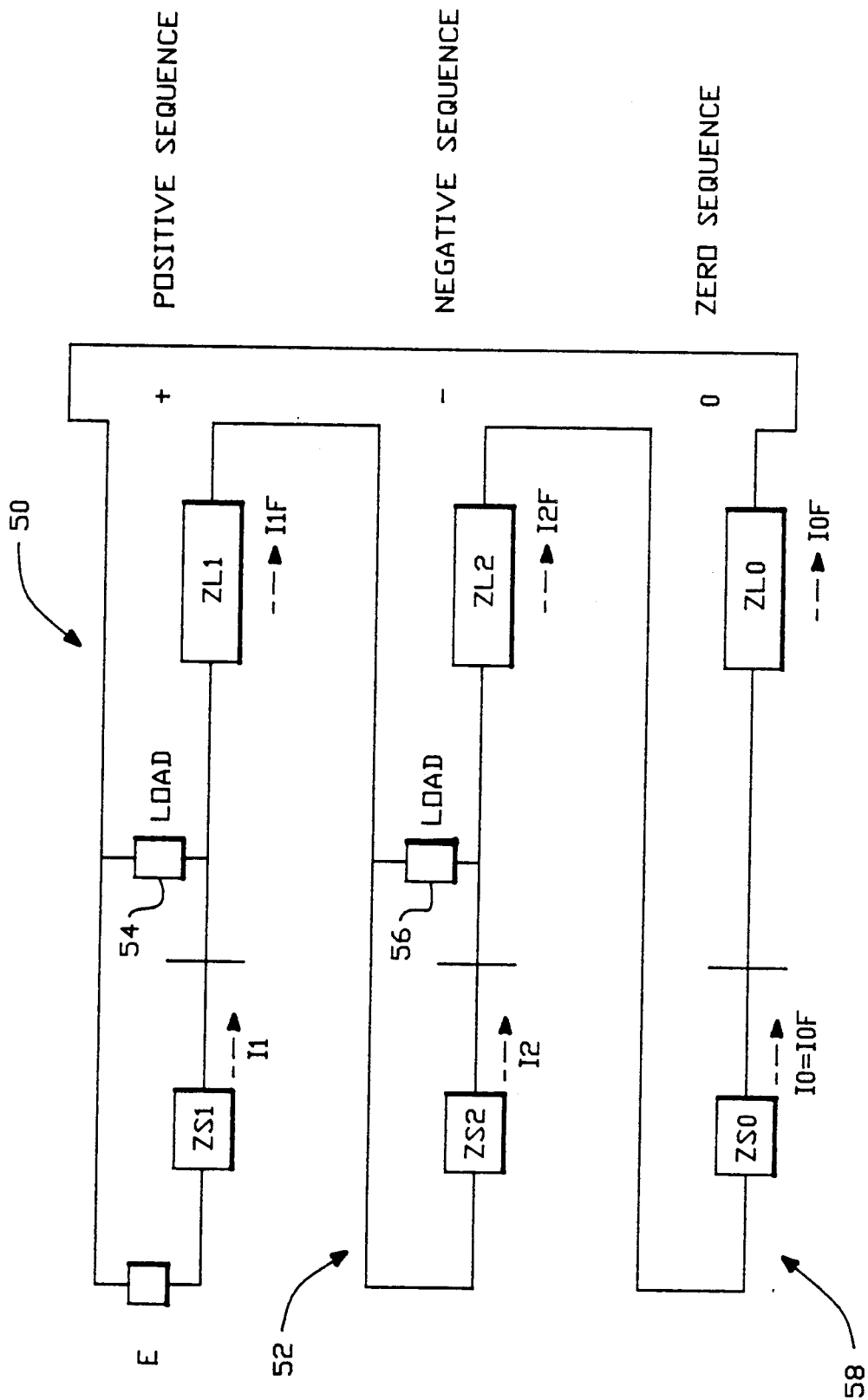
FIG. 2 is a schematic diagram illustrating the sequence network for a radial system with a tapped load.

FIG. 2 is a sequence network drawing for a radial network with a ground fault on the reference phase, i.e., in this example, phase A. As shown, the positive- and negative-sequence networks, represented generally by reference numerals 50 and 52, respectively, include shunt branches 54 and 56 at the bus, which represent the net load effects on all the feeders 12, 14, and 16. No shunt branch is included in the zero-sequence network, represented generally by reference numeral 58, as a common assumption is made that the load stations are not zero-sequence sources to the feeders.

The block "E" represents the positive-sequence source of electromotive force (EMF). Arrows next to the source impedances ZS1, ZS2 and ZS0 indicate the assumed point of measurement of the currents I1 and I2 include the load current. I0 does not. I1 is not the same as I1F, the positive-sequence component of the fault current, and I2 is not the same as I2F, the negative-sequence component of the fault current. However, it is clear from FIG. 2 that:

$$I0F = I1F = I2F = \tfrac{1}{3}IR = \tfrac{1}{3}IAF \qquad (1)$$

where I0F is the zero-sequence component of the fault current, IR is the residual current, and IAF is the A phase current at the fault.

Only I0F is observable under the assumptions made here. Normally, as discussed, the positive-sequence impedance Z1 to the fault is calculated using the following equation:

$$Z1 = VA/(IA + k \times IR) \qquad (2)$$

where k equals $\tfrac{1}{3}(ZL0/ZL1 - 1)$. The positive-sequence impedance Z1 consists of the positive-sequence resistance and the positive-sequence reactance. The residual current compensation factor k is known from the positive-sequence and zero-sequence impedances ZL1 and ZL0, respectively, of the faulted line. That is, it is a constant derived from these line constants, which, as is known in the art, are based on, among other things, the length and the height of the line, and the size of the conductor.

Because of the load currents being measured during the fault, which do not flow in all of the faulted line, if at all, IA is not accurate. In this case, IA is not equal to IAF. The solution is to use the residual current for phase A, as follows:

$$Z1 = VA/(IR + k \times IR) = VA/(IR \times (1+k)) \quad (3)$$

Data from an event report generated by a fault is easily processed by hand using equation (3), or a short program can be written for that purpose. The fault-locating relay 44 could be connected so that IA=IB-=IC=IR, and then the calculation would be performed directly in the relay; however, this destroys the phase information, which may be useful in identifying trouble. A better and more practical implementation is the version of the SEL-121 relay where ground faults are located using the principles of this invention i.e. equation (3).

Although a certain specific embodiment of the invention has been described herein in detail, the invention is not to be limited only to such embodiment, but rather only by the appended claims.

What is claimed is:

1. A method for determining the positive-sequence impedance to a fault comprising:

measuring the phase-to-ground voltage of the faulted line and the zero-sequence component of the fault current;

determining the residual current and using the residual current (IR) and the residual current compensation factor (k) to determine the positive-sequence impedance by dividing said phase-to-ground voltage by $IR \times (1+k)$.

2. A method of locating a phase-to-ground fault in a radial distribution circuit with at least one tapped load, comprising:

measuring the phase-to-ground voltage of the faulted line and the zero-sequence component of the fault current;

determining the residual current;

using the residual current (IR) and the residual current compensation factor (k) to determine the positive-sequence impedance by dividing said phase-to-ground voltage by $IR \times (1+k)$ wherein the positive-sequence impedance includes the positive-sequence resistance and reactance; and determining the distance to the fault by dividing the positive-sequence reactance by the total reactance of the faulted line and multiplying that value by the total length of the line.

3. The method of claim 2 wherein the residual current compensation factor is determined from the positive-sequence and zero-sequence impedances of the faulted line.

4. The method of claim 2 wherein the residual current is determined from the zero-sequence component of the fault current.

* * * * *